United States Patent [19]

Williamson et al.

[11] Patent Number: 5,116,800
[45] Date of Patent: May 26, 1992

[54] HIGH DURABILITY AND EXHUAST CATALYST WITH LOW HYDROGEN SULFIDE EMISSIONS

[75] Inventors: W. Burton Williamson, Broken Arrow; Douglas G. Linden; Jack C. Summers, II, both of Tulsa, all of Okla.

[73] Assignee: Allied-Signal Inc., Morris Township, Morris County, N.J.

[21] Appl. No.: 625,576

[22] Filed: Dec. 11, 1990

[51] Int. Cl.⁵ .................. B01J 21/04; B01J 23/10; B01J 23/58
[52] U.S. Cl. .................. 502/303; 502/328; 423/213.5
[58] Field of Search ............... 502/303, 328; 423/213.5

[56] References Cited

U.S. PATENT DOCUMENTS

| | | | |
|---|---|---|---|
| 4,172,047 | 10/1979 | Gandhi et al. | 252/466 PT |
| 4,722,920 | 2/1988 | Kimura et al. | 502/439 |
| 4,760,044 | 7/1988 | Joy, III et al. | 502/503 |
| 4,780,447 | 10/1988 | Kim et al. | 502/243 |
| 4,868,148 | 9/1989 | Henk et al. | 502/303 |
| 4,977,129 | 12/1990 | Ernest | 502/328 X |

FOREIGN PATENT DOCUMENTS

| | | |
|---|---|---|
| 0262962 | 9/1987 | European Pat. Off. |
| 0358125 | 9/1989 | European Pat. Off. |
| 3713629 | 10/1987 | Fed. Rep. of Germany ...... 502/303 |

OTHER PUBLICATIONS

Kirk-Othmer, Ency of Chem. Tech., Third Ed., vol. 2, pp. 225-233.
H. C. Yao et al., "Ceria in Automotive Exhaust Catalysts", J. Catal., 86, pp. 254-265 (1984).
K. Otto et al., "The Reduction of Nitric Oxide by Hydrogen over $Pt/\gamma-Al_2O_3$ as a Function of Metal Loading", J. Catal., 66, pp. 229-236 (1980).

Primary Examiner—W. J. Shine
Attorney, Agent, or Firm—Mary Jo Boldingh; Harold N. Wells; Roger H. Criss

[57] ABSTRACT

This invention relates to a high durability catalyst for treating automotive exhaust gas which produces a minimal amount of hydrogen sulfide and is essentially free of cerium oxide and which comprises a support consisting substantially of delta alumina, an effective amount of a promoter consisting essentially of barium oxide and, optionally, lanthanum oxide, and, effective amounts of the noble metals palladium and rhodium deposited on the support.

In an additional embodiment of the invention, the support may contain delta alumina, and, optionally zirconia, and the catalyst may contain an overlayer containing delta or gamma alumina, and optionally, zirconia. Effective amounts of the noble metals palladium and rhodium may be deposited on the support and/or on the overlayer.

In another aspect, the invention resides in a process for treating the exhaust gases from automotive engines to remove carbon monoxide, hydrocarbons, and nitrogen oxides, and to minimize the production of hydrogen sulfide.

21 Claims, No Drawings

HIGH DURABILITY AND EXHAUST CATALYST WITH LOW HYDROGEN SULFIDE EMISSIONS

BACKGROUND OF THE INVENTION

Hydrogen Sulfide Minimization

This invention relates generally to catalysts used to reduce the amount of hydrocarbons, carbon monoxide, and nitrogen oxides in automotive exhaust gas, and in particular to promoted delta-alumina supported catalysts which have high durability although they do not contain cerium oxide and which, in addition, minimize the amount of hydrogen sulfide in the exhaust gas without the use of nickel oxide.

In the past few years, automotive catalyst technology has improved such that the present-day catalysts have much higher activity and durability than in the past. Part of this improvement has been achieved by increasing the content of oxygen storage components such as cerium oxide which serve to "not only promot[e] the oxidation activity but also widen[] the air-fuel ratio window where all three major pollutants, HC, CO, and NO can be removed." (J. Catal., 86, 254 [1984]). Unfortunately, these oxygen storage components (e.g., cerium oxide) also have a detrimental effect: the components store sulfur on the catalyst and release virtually all of the stored sulfur over a very short period of time in the form of the foul-smelling compound hydrogen sulfide.

Hydrogen sulfide is formed over a catalyst in a number of different ways. The noble metal in an automotive catalyst may catalyze the conversion of sulfur oxides present in the exhaust stream to hydrogen sulfide. Also, sulfur can be stored on the catalyst support (e.g., alumina) as the sulfate under oxidizing conditions and later converted to hydrogen sulfide under reducing conditions (J. Catal., 66, 231 [1981]). Finally, sulfur may be stored on the oxygen storage component of the support under oxidizing conditions and later converted to hydrogen sulfide under reducing conditions. It is the larger release of hydrogen sulfide which follows the storage of sulfur on the oxygen storage component which has motivated researchers to try to minimize the hydrogen sulfide in the exhaust gas.

One solution researchers have found for the odor problem caused by hydrogen sulfide release is the use of sulfur "getters" such as nickel or iron. These getters hold the sulfur on the catalyst surface (typically as the sulfide) during fuel-rich conditions and release it slowly in a form other than hydrogen sulfide (e.g., $SO_2$, during lean operation). For example, U.S. Pat. No. 4,780,447 (Kim et al.) discloses a catalyst capable of controlling hydrocarbon, CO, and $NO_x$ emissions as well as hydrogen sulfide emissions. The catalyst contains oxides of Ni and/or Fe as hydrogen sulfide getters as well as noble metals promoted with cerium oxide-rich rare earth oxides. U.S. Pat. No. 4,760,044 (Joy et al.) also discloses the use of an hydrogen sulfide getter, and, in addition, teaches that the getter, in order to be most effective for hydrogen sulfide minimization, must be separated from the primary support (e.g., alumina) and the main catalytic metal (e.g., platinum) to prevent detrimental solid state reactions.

One problem with catalysts employing getters, however, is that getters such as nickel have possible negative environmental and/or carcinogenic effects. One non-nickel containing catalyst which minimizes hydrogen sulfide is disclosed in U.S. Pat. No. 4,868,148 (Henk et al.). The catalyst is a cerium-containing catalyst which minimizes hydrogen sulfide in the emissions by separating the noble metal from the cerium oxide. Another non-nickel cerium-containing catalyst is disclosed in European patent application 0 358 125 (Degussa) where hydrogen sulfide emissions are reduced using a catalyst containing alumina, cerium oxide, boron oxide, and noble metals with zirconia and other oxides as optional components.

Delta Alumina as an Automotive Catalyst Support

Specific use of delta alumina as a support for automotive exhaust catalysts is not common. U.S. Pat. No. 4,722,920 (Kimura et al.) discloses the use of a highly pure ($\geq 99.95\%$) delta alumina promoted with lanthanum oxide for automotive exhaust treatment for the purpose of providing a heat-resistant alumina support which retains a sufficient surface area even after heating at high temperatures above 1000° C. Delta alumina treated with promoters and cerium oxide is also disclosed as beneficial for an automotive exhaust treatment support in the place of gamma alumina for high temperature durability in copending U.S. patent application, Ser. No. 07/450,634 ("High-Temperature Three-Way Catalyst," filed Dec. 14, 1989, now U.S. Pat. No. 5,041,407, W. Burton Williamson et al.). Alpha alumina is taught as a support in place of gamma alumina for a rhodium catalyst in order to minimize the adverse interactions between rhodium and gamma alumina in U.S. Pat. No. 4,172,047 (Gandhi et al.). However, none of these references discloses a promoted palladium-rhodium delta alumina-supported automotive exhaust treatment catalyst which can achieve high durability and minimal hydrogen sulfide emissions with essentially no cerium oxide.

Catalysts with Overlayers

A catalyst containing a inner layer of platinum and ceria and an outer layer of rhodium and zirconia is taught in European patent application 0 262 962 (Engelhard) in order to separate rhodium from gamma-alumina. No mention of hydrogen sulfide minimization is made in the application.

The instant invention addresses the problem of providing a high durability catalyst with low hydrogen sulfide emissions in a unique manner by providing a catalyst which has those properties without the use of either the sulfur-storing oxygen storage component cerium oxide or a sulfur "getter" such as nickel. Previously, the cerium oxide oxygen storage component was thought to be necessary to achieve a high durability catalyst. The results of the instant invention are novel in that the durability of the catalyst is comparable to a catalyst containing cerium oxide, but without the cerium oxide and its attendant high hydrogen sulfide emissions.

SUMMARY OF THE INVENTION

This invention relates to a high durability catalyst for treating automotive exhaust gas which produces a minimal amount of hydrogen sulfide and is essentially free of cerium oxide and which comprises a support consisting substantially of delta alumina, an effective amount of a promoter consisting essentially of barium oxide and, optionally, lanthanum oxide deposited on the support, and, effective amounts of the noble metals palladium and rhodium deposited on the support. The finished catalyst will typically contain about 15 to 30 wt. % alumina, preferably about 17 to 20 wt. %, about 0.3 to 6 wt. % barium, preferably about 0.5 to 1.6 wt. %, 0 to about 8 wt. % lanthanum, preferably about 1 to 3 wt. %, about 0.01 to 0.9 wt. % palladium, preferably about 0.05 to 0.5 wt. %, and about 0.005 to 0.3 wt. % rhodium, preferably about 0.007 to 0.06 wt. %, based on the total weight of the catalyst.

In an additional embodiment of the invention, the support may contain delta alumina, and, optionally, zirconia, and the catalyst may contain an overlayer consisting substantially of delta or gamma alumina, and optionally, zirconia, deposited over the support. Effective amounts of the noble metals palladium and rhodium may be deposited on the support and/or on the overlayer. The finished catalyst will contain 0 to about 6 wt. % zirconia, preferably about 0.05 to 3 wt. % zirconia, based on the total weight of the catalyst.

In another aspect, the invention resides in a process for treating the exhaust gases from automotive engines to remove carbon monoxide, hydrocarbons, and nitrogen oxides, and to minimize the production of hydrogen sulfide, comprising contacting said gases under conversion conditions with the exhaust catalyst described above.

DETAILED DESCRIPTION OF THE INVENTION

Support/Overlayer

With respect to the present invention the terms "support" and "overlayer" refer to the material on which the noble metals and promoters are deposited. The support may be in pelleted form or more preferably will be in the form of a powdered material (i.e., as a "washcoat") which is deposited on an inert structure such as a honeycomb monolith made of ceramics or metal, as will be familiar to those skilled in the art. The overlayer will generally be in the form of a powdered material.

The support used in the present invention consists substantially of delta alumina, a compound obtained by the calcination of aluminum trihydrate. The more usual aluminas are the gamma and eta forms which result from a lower temperature calcination. See, for example, the discussion in Kirk-Othmer, *Encyclopedia of Chemical Technology*, Third Ed., Vol. 2, pages 225-233. The amount of delta alumina present will depend upon the method of preparation. The support may also contain zirconia. For use as a washcoat on a monolith the alumina will have an average particle size in the range of about 1 μm to 50 μm. Such support powder will have noble metals and promoters, and optionally, zirconia, deposited on it by methods to be described. The noble metals and promoters will be deposited onto the support powder either before or after it is slurried in water and applied to the monolith by methods known to the art. The same technique could be applied to an inert pellet. The overlayer consists substantially of delta alumina and, optionally, zirconia, or gamma alumina and zirconia. Noble metals may be applied to the overlayer also. The finished catalyst will typically contain about 15 to 30 wt. % alumina, preferably from about 17 to 20 wt. %, and 0 to about 6 wt. % zirconia, preferably from about 0.05 to 3 wt. %, based on the total weight of the catalyst.

Noble Metals

The noble metal components will be palladium and rhodium. The amount of palladium employed will range from about 0.01 to 0.9 wt. % based on the total weight of the finished catalyst, preferably from about 0.05 to 0.5 wt. %. The amount of rhodium employed will range from about 0.005 to 0.3 wt. %, preferably from about 0.007 to 0.06 wt. %, based on the total weight of the catalyst.

The noble metals are applied to the support or to the overlayer by decomposing a noble metal compound which has been deposited on the support or overlayer. Examples of such compounds include the following: chloropalladic acid, palladium chloride, palladium nitrate, diamminepalladium hydroxide, tetraamminepalladium chloride, rhodium trichloride, hexaamminerhodium chloride, rhodium carbonylchloride, rhodium trichloride hydrate, rhodium nitrate, sodium hexachlororhodate, and sodium hexanitrorhodate. Preferred compounds would be chloropalladic acid and rhodium chloride.

The noble metals are to be applied either separately or in combination by techniques familiar to those skilled in the art.

The advantage to using delta alumina and, optionally, zirconia, in the support or in the overlayer is to enable separation of rhodium from gamma alumina in order to prevent the adverse interactions. There are less adverse interactions between rhodium and delta alumina and even less between rhodium and zirconia. The overlayer also enables the separation of palladium from rhodium, thus inhibiting alloying between the two noble metals.

Promoters/Stabilizers

The instant invention teaches that an automotive catalyst can be made which is comparable in durability to cerium oxide-containing catalysts while containing essentially no cerium oxide and which possesses the additional benefit of low hydrogen sulfide emissions. This catalyst is promoted by placing barium oxide and, optionally, lanthanum oxide onto the delta alumina support or overlayer. In general, effective amounts of the promoters will be used. The amount of barium on the finished catalyst will range from about 0.3 to 6 wt. %, preferably from about 0.5 to 1.6, and the amount of lanthanum will range from 0 to about 8 wt. %, preferably from about 1 to 3 wt. % based on the total weight of the catalyst.

These promoter elements will be applied as decomposable compounds, usually in an aqueous solution, by methods familiar to those killed in the art. Examples of such compounds include the halides, nitrates, and acetates, preferably the acetates. After calcining at a temperature of about 400° C. to 700° C. for about 1 to 3 hours, the promoter elements will be present as their metal oxides.

Catalyst Preparation

Catalysts of the instant invention may be prepared by methods known to those skilled in the art and which have in common the use of delta alumina as the support for noble metals and promoters.

The delta alumina will be reduced to a suitable size, by milling as required to provide particles of about 1 to 50 μm, preferably about 5 to 10 μm, and then dried at a temperature of about 100° to 600° C. for 1 to 3 hours to produce a powder suitable for washcoating a relatively non-porous substrate. At this point, a promoter may be applied by impregnation of the powder with an aqueous solution of the promoter compound and the powder subsequently dried then calcined at 400° to 700° C. for 1 to 3 hours. The powder is then slurried in water or another suitable liquid and the substrate immersed, sprayed, or otherwise covered with the slurry. The slurry-coated substrate is then calcined at 400° to 700° C. for 1 to 3 hours. At this point again, a promoter may be applied by impregnation and the substrate subsequently calcined at 400° to 700° C. for 1 to 3 hours. The noble metals may then be impregnated either by sequential or co-impregnation and the substrate again calcined at about 400° to 700° C. for 1 to 3 hours.

For the preparation of the zirconia-containing catalysts, the above process is carried except that only one of the noble metals is generally deposited on the support while the other is deposited on an overlayer created by coating a slurry over the support-coated substrate. This slurry may contain delta alumina (where zirconia is already in the substrate), zirconia-delta alumina, or zirconia-gamma alumina. The zirconia-containing slurry is prepared by impregnating alumina powder with a zirconium compound (e.g., zirconium acetate) before slurrying. The slurry is applied to the substrate as an overlayer. The overlayer-containing catalyst may then be impregnated with additional noble metal.

The alumina or alumina/zirconia powders used to form the support or the overlayer may in the alternative be impregnated or otherwise have both the active catalytic metals and promoters deposited onto them before each slurrying step. For example, a powder may be impregnated with salts of barium, lanthanum, palladium, or rhodium, dried, calcined at about 400° to 700° C., and then slurried and applied to the substrate. In either case, the noble metals and promoters may be applied to the alumina powder by methods familiar in the art.

EXAMPLE 1

Catalyst A

A conventional catalytic composite was prepared with Pt and Rh on a $\gamma$-$Al_2O_3$ support with a $\gamma$-$Al_2O_3$/$CeO_2$ overcoat. A powdered $\gamma$-$Al_2O_3$ was slurried in water with nitric acid and applied to a cordierite monolith supplied by Corning which had 64 square cells per square centimeter. The volume of the monolith was 1.8 L and the total amount of washcoat was 189 g/L. The washcoated monolith was calcined and then immersed in an aqueous solution of 0.25 wt. % $H_2PtCl_6$, 0.05 wt. % $RhCl_3$, and 5 wt. % sugar. The monolith was again washcoated with a cerium acetate-impregnated $\gamma$-$Al_2O_3$ to form the overlayer. The resulting impregnated monolith contained 1.18 g/L Pt, 0.24 g/L Rh, and 31.8 g/L Ce, and the finished catalyst density was 560 g/L. This catalyst will be designated as Catalyst A with the description 'G-Pt-Rh-Ce' ('G' in the description signifies $\gamma$-$Al_2O_3$).

EXAMPLE 2

Catalyst B

A second conventional catalytic composite was prepared by the following method: A $CeO_2$/$\gamma$-$Al_2O_3$ powder prepared by impregnating boehmite alumina with cerium acetate followed by a calcination was co-milled then slurried with $BaSO_4$ and a NiO/$CeO_2$ powder. The resulting slurry was applied to a cordierite monolith supplied by Corning which had 64 square cells per square centimeter. The volume of the monolith was 1.8 L and the total amount of washcoat was 174 g/L. The washcoated monolith was calcined and then immersed in an aqueous solution of 0.25 wt. % $H_2PtCl_6$, 0.05 wt. % $RhCl_3$, and 5 wt. % sugar. The resulting impregnated monolith contained 1.2 g/L Pt, 0.24 g/L Rh, 41.0 g/L Ce, 4.6 g/L Ba and 5.0 g/L Ni, and the finished catalyst density was 560 g/L. This catalyst will be designated as Catalyst B with the description 'G-Pt-Rh-Ba-Ce-Ni' ('G' in the description signifies $\gamma$-$Al_2O_3$).

EXAMPLE 3

Catalyst C

A first experimental catalytic composite was prepared with Pd and Rh on a $\delta$-$Al_2O_3$ support promoted with barium oxide and lanthanum oxide. A powdered $\delta$-$Al_2O_3$ (Condea Puralox SCCa—S-90) was mixed with lanthanum acetate to provide an $Al_2O_3$/La weight ratio of 5.69:1. The mixture was dried and calcined at 538°C. for 1 hour. After cooling, the resulting powder was slurried in water with $BaSO_4$ and nitric acid and applied to a cordierite monolith supplied by Corning which had 64 square cells per square centimeter. The volume of the monolith was 1.8 L and the total amount of washcoat was 126 g/L. The washcoated monolith was then calcined and, finally, immersed in an aqueous solution of 0.25 wt. % $H_2PdCl_4$, 0.05 wt. % $RhCl_3$, and 5 wt. % sugar. The resulting impregnated monolith contained 1.18 g/L Pd, 0.24 g/L Rh, 7.77 g/L Ba, and 17.2 g/L La, and the finished catalyst density was 560 g/L. This catalyst will be designated as Catalyst C with the description 'D-Pd-Rh-Ba-La' ('D' in the description signifies $\delta$-$Al_2O_3$).

EXAMPLE 4

Catalyst D

A second experimental catalytic composite was prepared with Pd and Rh on a $\delta$-$Al_2O_3$ support promoted with barium oxide. A powdered $\delta$-$Al_2O_3$ (Condea Puralox SCCa—S-90) was mixed with barium acetate to provide an $Al_2O_3$/Ba weight ratio of 12.58:1. The mixture was dried and calcined at 538° C. for 1 hour. After cooling, the resulting powder was slurried in water with nitric acid and applied to a cordierite monolith supplied by Corning which had 64 square cells per square centimeter. The volume of the monolith was 1.8 L and the total amount of washcoat was 106 g/L. The washcoated monolith was then immersed in an aqueous solution 0.25 wt. % $H_2PdCl_4$, 0.05 wt. % $RhCl_3$, and 5 wt. % sugar. The resulting impregnated monolith contained 1.18 g/L Pd, 0.24 g/L Rh, and 7.77 g/L Ba, and the finished catalyst density was 560 g/L. This catalyst will be designated as Catalyst D with the description 'D-Pd-Rh-Ba' ('D' in the description signifies $\delta$-$Al_2O_3$).

EXAMPLE 5

Catalyst E

A third experimental catalytic composite was prepared with two layers. The first layer comprised Pd supported on a $\delta$-$Al_2O_3$ which was promoted with barium oxide and lanthanum oxide. The second layer, an overlayer, comprised $\delta$-$Al_2O_3$ which was previously impregnated with zirconium acetate, with Rh impregnated over the second layer.

The catalyst was prepared as follows: A powdered $\delta$-$Al_2O_3$ (Condea Puralox SCCa—S-90) was mixed with lanthanum acetate to provide an $Al_2O_3$/La weight ratio of 5.69:1. The mixture was dried and calcined at 538° C. for 1 hour. After cooling, the resulting powder was slurried in water with $BaSO_4$ and nitric acid and applied to a cordierite monolith supplied by Corning which had 64 square cells per square centimeter. The washcoated monolith was then immersed in an aqueous solution of 0.25 wt. % H₂PdCl₄, and 5 wt. % sugar and then calcined. A second batch of powdered δ-Al₂O₃ Condea Puralox SCCa—S-90) was mixed with zirconium acetate to provide an Al₂O₃/Zr weight ratio of 2.16:1. The mixture was dried and calcined at 538° C. for 1 hour. After cooling, the resulting powder was slurried in water with nitric acid and applied to the previously washcoated monolith as an overlayer. The monolith was again calcined and finally immersed in an aqueous solution 0.05 wt. % RhCl₃, and 5 wt. % sugar and calcined. The volume of the monolith was 1.8 L and the total amount of washcoat was 146 g/L. The resulting impregnated monolith contained 1.18 g/L Pd, 0.24 g/L Rh, 7.77 g/L Ba, 17.2 g/L La, and 5.65 g/L Zr, and the finished catalyst density was 560 g/L. This catalyst will be designated as Catalyst E with the description "D-Pd-Rh-Ba-La-Zr" ('D' in the description signifies δ-Al₂O₃).

EXAMPLE 6

Catalyst F

A fourth experimental catalytic composite was prepared with two layers. The first layer comprised Pd supported on a δ-Al₂O₃ which was promoted with barium sulfate. The second layer, an overlayer, comprised δ-Al₂O₃ which was previously impregnated with zirconium acetate, with Rh impregnated over the second layer.

The catalyst was prepared as follows: δ-Al₂O₃ powder was slurried in water with BaSO₄ and nitric acid and applied to a cordierite monolith supplied by Corning which had 64 square cells per square centimeter. The washcoated monolith was then immersed in an aqueous solution of 0.25 wt. % H₂PdCl₄, and 5 wt. % sugar and then calcined. A second batch of powdered δ-Al₂O₃ (Condea Puralox SCCa—S-90) was mixed with zirconium acetate to provide an Al₂O₃/Zr weight ratio of 2.16:1. The mixture was dried and calcined at 538° C. for 1 hour. After cooling, the resulting powder was slurried in water with nitric acid and applied to the previously washcoated monolith as an overlayer. The monolith was again calcined and finally immersed in an aqueous solution 0.05 wt. % RhCl₃, and 5 wt. % sugar and calcined. The volume of the monolith was 1.8 L and the total amount of washcoat was 126 g/L. The resulting impregnated monolith contained 1.18 g/L Pd, 0.24 g/L Rh, 7.77 g/L Ba, and 5.65 g/L Zr, and the finished catalyst density was 560 g/L. This catalyst will be designated as Catalyst F with the description "D-Pd-Rh-Ba-Zr" ('D' in the description signifies δ-Al₂O₃).

EXAMPLE 7

Hydrogen Sulfide Emissions Test

This example describes a test developed to measure hydrogen sulfide (H₂S) emissions. The test consists of two parts: storage of sulfur compounds and H₂S release. The catalyst is first preconditioned in the reactor with a stoichiometric feed gas (air/fuel ratio (A/F)=14.56) at 566° C. for 15 minutes. Next, sulfur compounds are stored by contacting the catalyst with a lean feed gas (A/F=14.80) containing 30 ppm of SO₂ for 30 minutes at 550° C. At the end of the storage period, the feed gas composition is changed to rich (A/F=12.82) allowing the catalyst to release H₂S. The released H₂S is collected over an 80 second interval in a zinc acetate solution and analyzed using a modified version of the Environmental Protection Agency (EPA) procedure. (Details on the EPA's H₂S analysis method are available in EPA interim report EPA-600/2/80-068 which is available from the EPA.) The feed gas concentrations for the lean and rich gases are set out in Table 1. The space velocity is 46,600 hr⁻¹ for a 1" diam. × 2" long catalyst sample.

TABLE 1

| Gas | Feed Gas Concentrations (%) | | |
|---|---|---|---|
| | Preconditioning | Storage | Release |
| HC* | 0.076 | 0.076 | 0.076 |
| CO | 1.429 | 1.350 | 4.700 |
| H₂ | 0.476 | 0.450 | 1.566 |
| O₂ | 0.965 | 1.250 | 0.200 |
| NOₓ | 0.110 | 0.110 | 0.110 |
| CO₂ | 12.000 | 12.000 | 12.000 |
| SO₂ | 0.000 | 0.003 | 0.003 |
| H₂O | 10.000 | 10.000 | 10.000 |
| N₂ | Balance | Balance | Balance |
| A/F Ratio | 14.56 | 14.80 | 12.82 |

*The hydrocarbon is a 2:1 blend of propylene and propane.

EXAMPLE 8

Evaluation of Catalysts for H₂S Emissions

The catalysts prepared in Examples 1 through 6 were evaluated using the test described in Example 7. The results of this evaluation are presented in Table 2.

TABLE 2

| Catalyst | Sample I.D | H₂S Release (ppm) |
|---|---|---|
| C | D-Pd-Rh-Ba-La | 63 |
| E | D-Pd-Rh-Ba-La-Zr | 115 |
| D | D-Pd-Rh-Ba | 239 |
| F | D-Pd-Rh-Ba-Zr | 383 |
| A | G-Pt-Rh-Ce | 624 |
| B | G-Pt-Rh-Ba-Ce-Ni | 50-113 |

These results clearly indicate that in the absence of CeO₂, the use of Pd instead of Pt and promoted δ-Al₂O₃ in place of γ-Al₂O₃ with CeO₂ greatly reduces the amount of H₂S released. The data show that the non-Ce-containing catalysts of the instant invention (Catalysts C, D, E, and F) approach the low H₂S release values of Catalyst B, the Ce-containing catalyst with the Ni getter.

EXAMPLE 9

Catalyst Aging and Durability Testing

In order to provide accelerated aging of the catalyst, the catalysts prepared in Examples 1 through 6 were exposed to exhaust gas from an engine operated at and near stoichiometric conditions. A Ford 5.0 liter V-8 engine having throttle body fuel injection was operated for 60 seconds with a predetermined air-fuel ratio, followed by 5 seconds with no fuel so that the air-fuel ratio becomes very lean. The cycle was repeated for a total of 100 hours. The fuel was a commercial lead free premium fuel.

The durability of the aged catalysts was determined in a second test using the exhaust gases from a Ford 5.0 liter V-8 engine. The hydrocarbon (HC), carbon monoxide (CO), and nitrogen oxides (NO) at the catalyst outlet were measured for a series of air-fuel ratios which traversed the stoichiometric and near-stoichiometric region from air-fuel ratios of 15/1 to 14/1. At each nominal value, the air-fuel ratio fluctuated ±0.4 units @ 1 Hz. The space velocity of the gases was about 30,000 hr⁻¹. The integral performance is reported at the conversion at air-fuel ratios of 14.71, 14.66, 14.61, 14.56, 14.51, 14.46, and 14.41. The performance at stoichiometric conditions is represented at an air-fuel ratio of 14.56, while an air-fuel ratio of 14.85 is slightly lean and an air-fuel ratio of 14.25 is slightly rich. The evaluation fuel used is clear indolene. The nitrogen oxides at the inlet of the catalyst was controlled at 1800 wt. ppm ±50.

The results of the H$_2$S emissions and catalyst durability tests are summarized in the tables below.

TABLE 3

| Catalyst Description | | % Conversion (450° C. Inlet) | |
|---|---|---|---|
| | | C D-Pd-Rh-Ba-La | A G-Pt-Rh-Ce |
| Integral Performance (Stoich ± 0.15 A/F) | HC | 92 | 89 |
| | CO | 68 | 66 |
| | NO$_x$ | 69 | 70 |
| A/F = 14.85 | HC | 93 | 94 |
| | CO | 94 | 93 |
| | NO$_x$ | 47 | 48 |
| A/F = 14.56 | HC | 92 | 90 |
| | CO | 68 | 66 |
| | NO$_x$ | 68 | 69 |
| A/F = 14.25 | HC | 67 | 60 |
| | CO | 31 | 34 |
| | NO$_x$ | 93 | 93 |
| H$_2$S (ppm, fresh) | | 63 | 624 |

Table 3 illustrates the results of a test which was run to compare the aged catalytic durability of Catalyst C, a Pd-Rh catalyst of the instant invention supported on δ-Al$_2$O$_3$ and promoted with barium oxide and lanthanum oxide, with Catalyst A, a Pt-Rh catalyst supported on γ-Al$_2$O$_3$ promoted with CeO$_2$. The comparison shows that the durability of non-Ce-containing Catalyst C is comparable to the durability of the Ce-containing Catalyst A. The comparison also shows that the H$_2$S emissions of the catalyst of the instant invention, Catalyst C, are much lower than those of the CeO$_2$-containing Catalyst A.

TABLE 4

| Catalyst Description | | % Conversion (450° C. Inlet) | |
|---|---|---|---|
| | | C D-Pd-Rh-Ba-La | D D-Pd-Rh-Ba |
| Integral Performance (Stoich ± 0.15 A/F) | HC | 95 | 95 |
| | CO | 89 | 84 |
| | NO$_x$ | 76 | 73 |
| A/F = 14.85 | HC | 96 | 95 |
| | CO | 98 | 97 |
| | NO$_x$ | 50 | 49 |
| A/F = 14.56 | HC | 95 | 95 |
| | CO | 91 | 85 |
| | NO$_x$ | 76 | 72 |
| A/F = 14.25 | HC | 79 | 72 |
| | CO | 41 | 38 |
| | NO$_x$ | 100 | 96 |
| H$_2$S (ppm, fresh) | | 63 | 239 |

Table 4 illustrates the results of a test which was run to compare the aged catalytic durability of Catalysts C and D, two Rd-Rh-Ba catalysts of the instant invention supported on δ-Al$_2$O$_3$ and prepared with and without lanthanum oxide, respectively. The comparison shows that the durability of the catalysts are comparable, but that the H$_2$S emissions of Catalyst C, the lanthanum oxide-containing catalyst, are much lower than those of Catalyst D, the catalyst without lanthanum oxide. The H$_2$S emissions of Catalyst D are, however, still considerably lower than the emissions of Catalyst A (624 ppm), the cerium containing catalyst of Table 3.

TABLE 5

| Catalyst Description | | % Conversion (450° C. Inlet) | |
|---|---|---|---|
| | | E D-Pd-Rh-Ba-La-Zr | F D-Pd-Rh-Ba-Zr |
| Integral Performance (Stoich ± 0.15 A/F) | HC | 95 | 93 |
| | CO | 90 | 71 |
| | NO$_x$ | 72 | 69 |
| A/F = 14.85 | HC | 95 | 94 |
| | CO | 98 | 94 |
| | NO$_x$ | 51 | 49 |
| A/F = 14.56 | HC | 95 | 93 |
| | CO | 91 | 71 |
| | NO$_x$ | 72 | 68 |
| A/F = 14.25 | HC | 76 | 73 |
| | CO | 47 | 35 |
| | NO$_x$ | 96 | 95 |
| H$_2$S (ppm, fresh) | | 115 | 383 |

Table 5 illustrates the results of a test which was run to compare the aged catalystic durabilities of Catalysts E and F, two Pd-Rh-Ba-Zr catalysts of the instant invention supported on δ-Al$_2$O$_3$ and prepared with and without lanthanum oxide, respectively. The comparison shows that the durabilities of the two catalysts are comparable except for the superior CO conversion of the lanthanum oxide-containing catalyst, Catalyst E. Catalyst E also has superior H$_2$S minimizations, although the H$_2$S emissions of the catalyst without lanthanum oxide, Catalyst F, are still considerably lower than the emissions of Catalyst A (624 ppm), the cerium containing catalyst of Table 3.

TABLE 6

| Catalyst Description | | C % Conversion (450° C. Inlet) | B |
|---|---|---|---|
| | | D-Pd-Rh-Ba-La | G-Pt-Rh-Ba-Ce-Ni |
| Integral Performance (Stoich ± 0.15 A/F) | HC | 94 | 89 |
| | CO | 85 | 68 |
| | NO$_x$ | 75 | 71 |
| A/F = 14.85 | HC | 95 | 95 |
| | CO | 97 | 95 |
| | NO$_x$ | 43 | 46 |
| A/F = 14.56 | HC | 95 | 90 |
| | CO | 89 | 68 |
| | NO$_x$ | 74 | 71 |
| A/F = 14.25 | HC | 68 | 53 |
| | CO | 33 | 34 |
| | NO$_x$ | 98 | 91 |
| H$_2$S (ppm, fresh) | | 63 | 50-113 |

Table 6 illustrates the results of a test which was run to compare the aged catalytic durability of Catalyst C, a Pd-Rh catalyst of the instant invention supported on δ-Al$_2$O$_3$ and promoted with barium oxide and lanthanum oxide and Catalyst B, a Pt-Rh catalyst supported on γ-Al$_2$O$_3$ promoted with CeO$_2$ and a sulfur "getter," nickel. The comparison shows that the durability of Catalyst C is at least comparable to the durability of the CeO$_2$-containing Catalyst B. Table 6 also illustrates that the minimization of H$_2$S emissions achieved by the instant invention falls in the range of the minimization of H$_2$S achievable by Catalyst B which contains CeO$_2$ and employs a sulfur getter to minimize H$_2$S.

We claim:

1. A high durability catalyst for treating automotive exhaust gas which produces a minimal, amount of hydrogen sulfide and is essentially free of cerium oxide and which consists essentially of:

a) a support consisting substantially of delta alumina;

b) an effective amount of a promoter consisting essentially of barium oxide and, optionally, lanthanum oxide deposited on the support; and, c) effective amounts of the noble metals palladium and rhodium deposited on the support.

2. The catalyst of claim 1 wherein the catalyst contains about 15 to 30 wt. % alumina, about 0.3 to 6 wt. % barium, 0 to about 8 wt. % lanthanum, about 0.01 to 0.9 wt. % palladium, and about 0.005 to 0.3 wt. % rhodium based on the total weight of the catalyst.

3. The catalyst of claim 2 wherein the catalyst contains about 17 to 20 wt. % alumina.

4. The catalyst of claim 2 wherein the catalyst contains about 0.5 to 1.6 wt. % barium.

5. The catalyst of claim 2 wherein the catalyst contains about 1 to 3 wt. % lanthanum.

6. The catalyst of claim 2 wherein the catalyst contains about 0.05 to 0.5 wt. % palladium.

7. The catalyst of claim 2 wherein the catalyst contains about 0.007 to 0.06 wt. % rhodium.

8. A high durability catalyst for treating automotive exhaust gas which produces a minimal amount of hydrogen sulfide and is essentially free of cerium oxide and which comprises:

a) a support consisting substantially of delta alumina, and, optionally, zirconia;

b) an effective amount of a promoter consisting essentially of barium oxide and, optionally, lanthanum oxide deposited on the support;

c) an overlayer consisting of alumina, and optionally, zirconia, deposited over the support; and, d) effective amounts of the noble metals palladium and rhodium deposited on the support and/or on the overlayer.

9. The catalyst of claim 8 wherein the overlayer is substantially delta alumina.

10. The catalyst of claim 8 wherein the overlayer is substantially delta alumina and zirconia.

11. The catalyst of claim 8 wherein the overlayer is substantially gamma alumina and zirconia.

12. The catalyst of claim 8 wherein the noble metals are deposited on the support.

13. The catalyst of claim 8 wherein the noble metals are deposited on the overlayer.

14. The catalyst of claim 8 wherein the noble metals are deposited on the support and on the overlayer.

15. The catalyst of claim 8 wherein the catalyst contains about 15 to 30 wt. % alumina, about 0.3 to 6 wt. % barium, 0 to about 8 wt. % lanthanum, 0 to about 6 wt. % zirconia, about 0.01 to 0.9 wt. % palladium, and about 0.005 to 0.3 wt. % rhodium based on the total weight of the catalyst.

16. The catalyst of claim 15 wherein the catalyst contains about 17 to 20 wt. % alumina.

17. The catalyst of claim 15 wherein the catalyst contains about 0.5 to 1.6 wt. % barium.

18. The catalyst of claim 15 wherein the catalyst contains about 1 to 3 wt. % lanthanum.

19. The catalyst of claim 15 wherein the catalyst contains about 0.05 to 3 wt. % zirconia.

20. The catalyst of claim 15 wherein the catalyst contains about 0.05 to 0.5 wt. % palladium.

21. The catalyst of claim 15 wherein the catalyst contains about 0.007 to 0.06 wt. % rhodium.

* * * * *

UNITED STATES PATENT AND TRADEMARK OFFICE
CERTIFICATE OF CORRECTION

PATENT NO. : 5,116,800
DATED : May 26, 1992
INVENTOR(S) : Williamson et al.

It is certified that error appears in the above-identified patent and that said Letters Patent is hereby corrected as shown below:

Title page, item [54]: "High Durability and 'Exhuast Catalyst with Low Hydrogen Sulfide Emissions" should read --High Durability Auto Exhaust Catalyst with Low Hydrogen Sulfide Emissions--

Abstract, second paragraph, first line: "invention,m" should read --invention--

Column 1, line 1: "Durability and Exhuast" should read --Durability Auto Exhaust--

Column 4, line 48: "those killed in the art" should read --those skilled in the art--

Column 10, line 27: "minimizations" should read --minimization--.

Signed and Sealed this

Tenth Day of August, 1993

Attest:

MICHAEL K. KIRK

Attesting Officer    Acting Commissioner of Patents and Trademarks